Aug. 16, 1932.  H. E. ALLEN  1,872,550

SHEET GLASS DRAWING APPARATUS

Filed Jan. 10, 1921  2 Sheets-Sheet 1

INVENTOR
Horace E. Allen
BY C. A. Rowley
ATTORNEY

Aug. 16, 1932. H. E. ALLEN 1,872,550
SHEET GLASS DRAWING APPARATUS
Filed Jan. 10, 1921 2 Sheets-Sheet 2
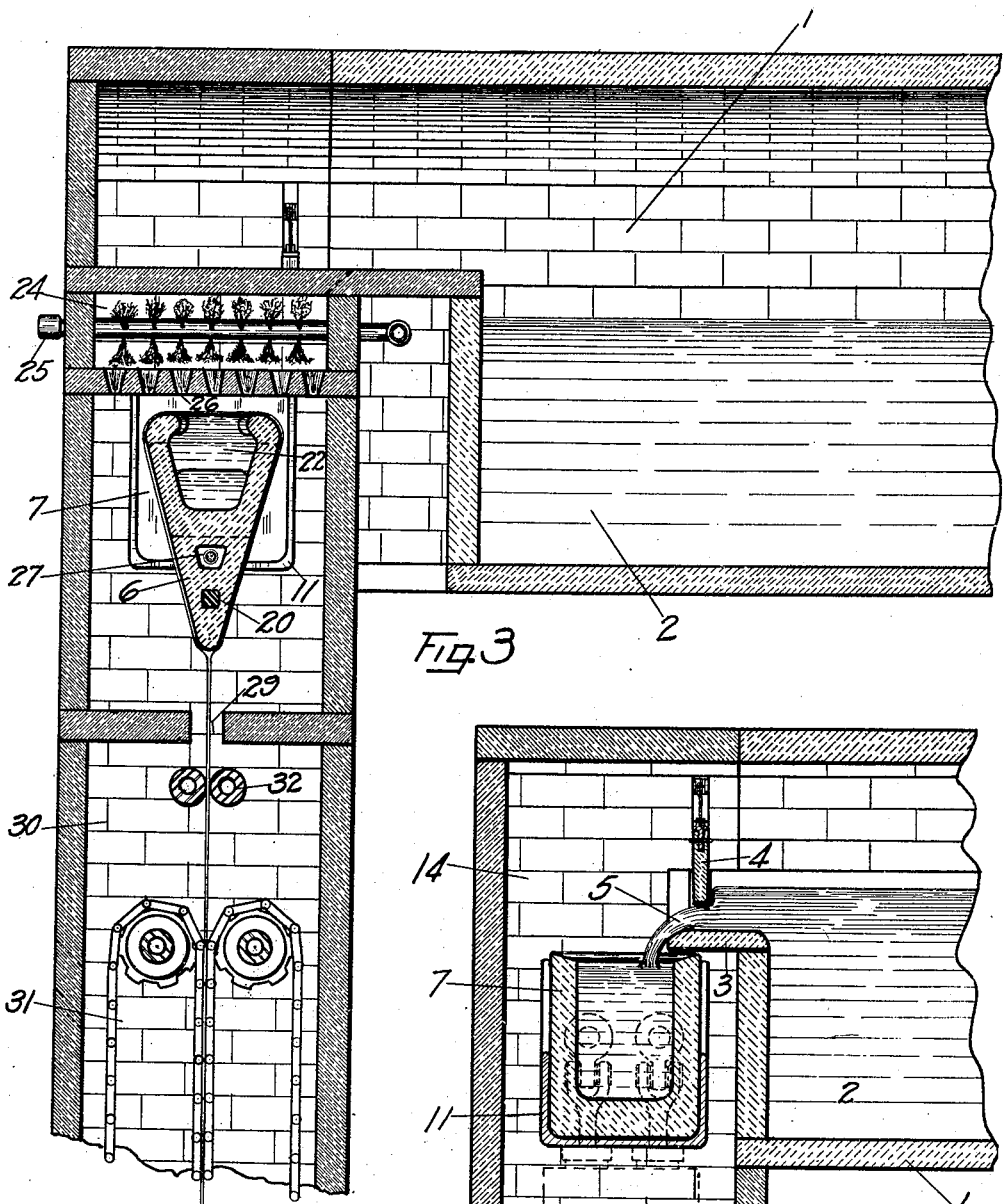
INVENTOR
Horace E. Allen
BY C. A. Rowley
ATTORNEY Patented Aug. 16, 1932

1,872,550

UNITED STATES PATENT OFFICE

HORACE E. ALLEN, OF TOLEDO, OHIO, ASSIGNOR TO LIBBEY-OWENS-FORD GLASS COMPANY, OF TOLEDO, OHIO, A CORPORATION OF OHIO

SHEET GLASS DRAWING APPARATUS

Application filed January 10, 1921. Serial No. 436,039.

The invention here disclosed relates to a new process for continuously producing sheet glass, and to an apparatus for accomplishing this process.

According to this invention, molten glass in an extremely fluid condition is caused to flow freely and continuously from a container in such a way that the surfaces of the flowing streams, which eventually form the outer surfaces of the glass sheet, never, from the time they leave the molten bath, until the sheet has formed and set, contact with anything except the surrounding heated atmosphere. In this way a sheet devoid of surface mars or scratches of any kind, and having a fine fire-polished surface, is produced. Furthermore, the sheet forming apparatus has no moving parts whatever, the entire mechanism being substantially fixed, except for occasional adjustments, thus avoiding the wear and consequent replacements necessary when constantly moving mechanism is operated in the presence of great heat. Further objects and details of the invention will become apparent from the following description taken in connection with the accompanying drawings.

Referring to the drawings:

Fig. 3 is a central longitudinal vertical section through the apparatus taken substantially on the line 3—3 of Fig. 1.

Fig. 4 is a vertical longitudinal section of a portion of the apparatus, taken substantially on the line 4—4 of Fig. 1.

Figure 1:
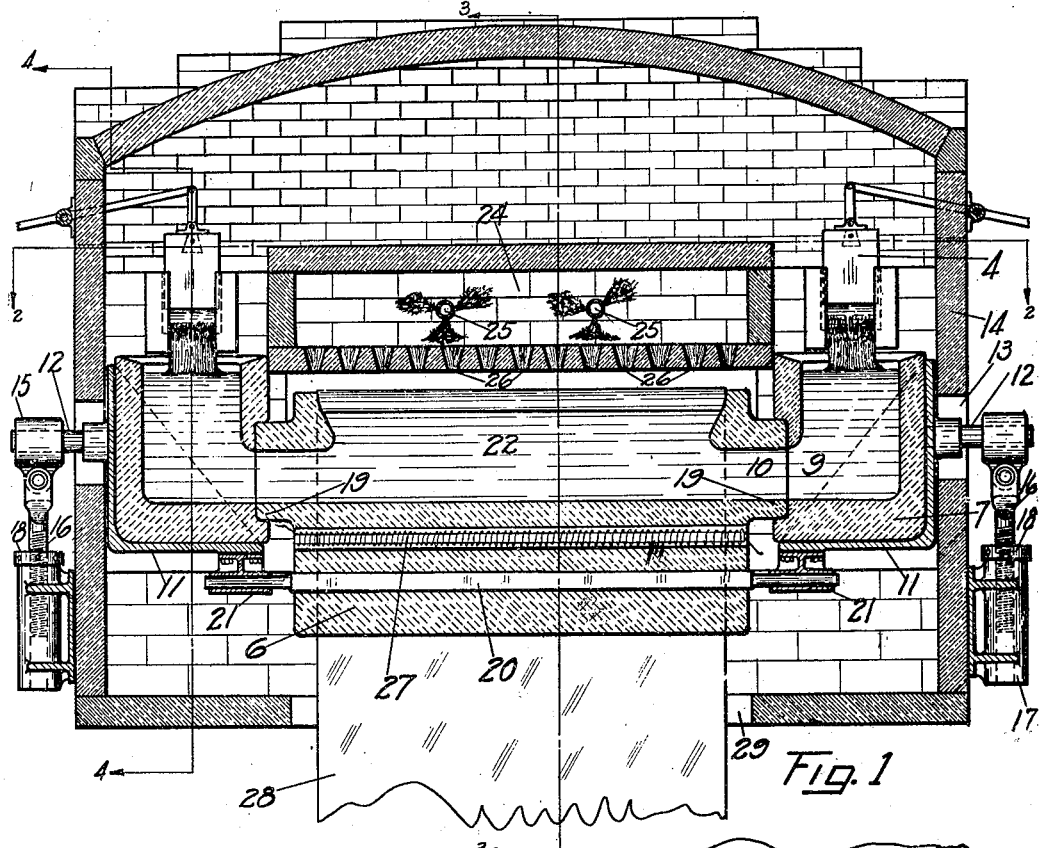
Fig. 1 is a vertical transverse section through the apparatus, taken substantially on the line 1—1 of Fig. 2.
Figure 2:
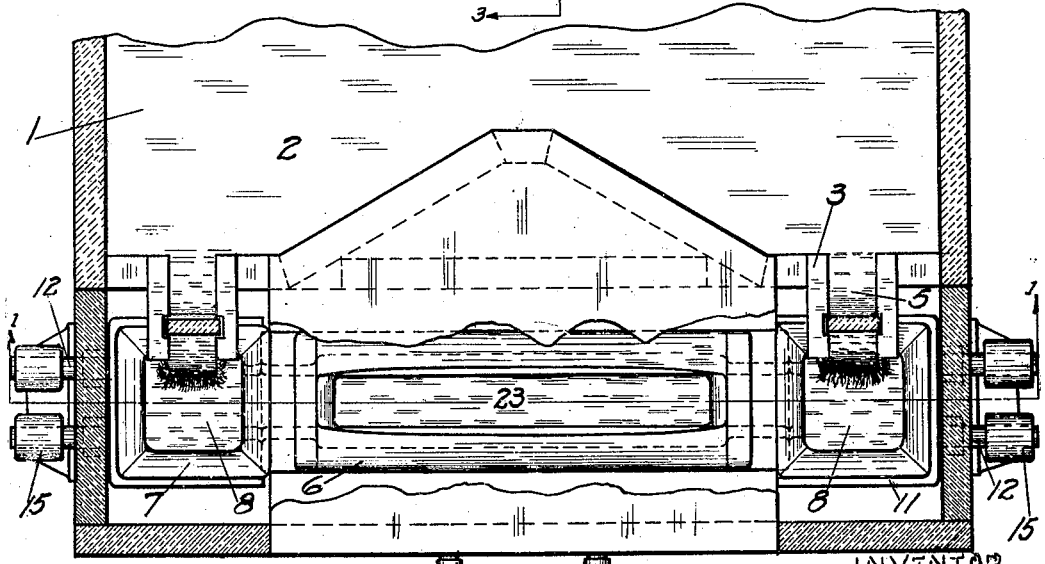
Fig. 2 is a horizontal section through the appartus taken substantially on the line 2—2 of Fig. 1, part of the heating chamber above the over-flow receptacle being broken away to disclose the upper portion of the receptacle.

At 1 is indicated, conventionally, the discharge end of a continuous tank furnace, which serves as a continuous source of molten glass for the sheet forming apparatus. A pair of conduits 3 lead from the discharge end of the tank, each conduit being provided with a gate or closure, shown in the form of a shear-cake 4, whereby the flow of glass 5 through the conduit, may be cut off or suitably regulated.

The sheet forming mechanism is here shown as comprising three main parts: a central wedge shaped container 6, and two end supply receptacles or pots 7, each constructed of some suitable refractory material such as fire-clay. Each receptacle 7, has an upper open end 8, for receiving the flow of glass from the conduit 3, and a lower passage 9, communicating with a similar passage 10, in the adjacent end of the wedge-shaped container 6. The receptacles 6 and 7 are substantially permanently united, and could if desirable or practical be formed as a single member. Each receptacle 7 is supported in a metallic bracket member 11, which has a pair of supporting rods 12, projecting out through an aperture 13 in the adjacent side of enclosing chamber 14. Each rod 12 is capable of rocking movement in a collar 15, pivotally carried at the upper end of a vertical screw 16. Each screw 16 is slidable vertically in an aperture in a supporting bracket 17, and is held in adjusted vertical position by a nut 18 carried by the upper face of bracket 17.

The wedge-shaped container 6 is supported between the two receptacles 7, partially by the end extensions 19 which project into similar recesses in the adjacent sides of receptacles 7, and partially by the metallic supporting member 20, which is embedded in the lower portion of the wedge. The ends of member 20 are carried by supporting brackets 21 depending from the brackets 11, as clearly illustrated in Fig. 1. The member 6, as best shown in Fig. 3 is of a narrow wedge shape, and is hollow at the thicker upper end to form a receptacle 22 for the molten glass which is fed in through the end passages 10. The upper side of member 6 is open, in the form of a long narrow slot 23. The head of molten glass in the end receptacles 7 is maintained somewhat higher than the top of slot 23, so that the molten glass will overflow through this slot, and spill over the sides of the container 6. The shallow sheet-like streams of glass which overflow at the sides of the container will adhere to the inwardly sloping sides of the container and come together at the lower edge of the wedge to form a single stream of glass. By suitably manipulating the adjusting nuts 18, the containers may be so positioned that the two streams of glass will be of equal thickness throughout. To further compensate for the somewhat hotter glass at the two ends of the container, the discharge slot 23 is slightly tapered, being wider at the middle and narrower at the ends.

The enclosing chamber 14 which substantially surrounds the glass-containing receptacles 6 and 7 is connected at its upper end with the furnace chamber and also contains suitable burners, not shown, to maintain the entire surrounding atmosphere at a high heat, as the molten glass must be maintained in a highly fluid condition to insure the proper operation of the apparatus. Directly above the container 6, is a heating chamber 24, having burners 25 therein, and a series of apertures 26 in its bottom to direct the heat downwardly onto the flowing glass. Also, to maintain the lower portion of the wedge at the proper temperature, an electric-heating apparatus is placed within the body of the wedge, below the receptacle 22, as indicated conventionally at 27.

In operation, the gates 4 are adjusted to obtain a suitable flow of molten glass from the tank 1. This glass flows into the receptacles 7, through passages 9 and 10 to the receptacle 22, and overflows through opening or slot 23 and down around the converging sides of the wedge member. The temperature is so regulated that the streams of molten glass will flow freely down the exterior of the container 6, but still be sufficiently viscous to maintain a sheet-like formation and adhere somewhat to the outer walls of the container. At the lower edge of the wedge, where the converging walls come together, the two sheets unite, and it will be observed that the two inner faces of the streams, which have been in engagement with the walls of the container, merge into the interior of the sheet, the two outer faces of the sheet being formed from the outer surfaces of the two streams, which have never, from the inception of the flowing process, contacted with any portion of the container or other structure. In this way a sheet having a fine fire-polish on both faces, and free from mars or scratches is obtained.

The sheet 28 may be allowed to flow away, under its own weight, through a slot 29 in the lower face of chamber 14, either into the open air as indicated in Fig. 1, or into a suitable annealing chamber 30 as shown in Fig. 3. In the chamber 30, has been illustrated a suitable drawing mechanism 31, of conventional type, preferably engaging the sheet at its edges only, for carrying the sheet away, and furnishing an added pull if the weight of the sheet itself be not sufficient. At 32 is a pair of guide rollers loosely engaging the faces of the set sheet to properly position same within the slot 29 and chamber 30. Any suitable apparatus may be employed for dividing the sheet into sections of the desired size and carrying them away.

It will be noted that when the parts are once properly adjusted, there are no moving parts whatever in the sheet forming portion of the apparatus. Thus there is nothing to wear or get out of order, and the process will be continuous and require little attention.

Claims:

1. In an apparatus for producing sheet glass, a hollow member having a slot at its upper side, and openings at the two ends, means for supplying molten glass through the end openings, the glass flowing up through the slot and down around the two sides of the hollow member and means for carrying away the united streams from the lower side of the hollow member in sheet form.

2. In an apparatus for producing sheet glass, a hollow member having a longitudinal opening at the top, and intake openings at its ends, means for supplying molten glass through the end openings, the glass overflowing through the top of the member, flowing down around the sides thereof and uniting at the lower side of the member to flow off as a single sheet of glass.

3. In an apparatus for producing sheet glass, a receptacle having downwardly converging side portions, means for supplying molten glass to the interior of the receptacle, the receptacle being so constructed that the glass will overflow in two shallow streams down the two converging sides and unite at the lower edge of the receptacle, a heated chamber in which the receptacle is enclosed, means for internally heating the receptacle, and means below the chamber for drawing away the sheet formed by the united molten streams.

4. In an apparatus for producing sheet glass, a hollow wedge shaped receptacle having downwardly converging sides, a longitudinal opening at the top, and end openings through which molten glass is caused to flow to the interior of the receptacle, and a heated chamber in which the receptacle is located, the chamber having an opening in its bottom through which the sheet of glass formed from the united overflow streams of molten glass passes.

5. In an apparatus for producing sheet glass, a hollow wedge shaped receptacle having downwardly converging sides, a longitudinal opening at the top, and end openings through which molten glass is fed to the interior of the receptacle, a heater above the wedge for heating the molten glass as it overflows down the sides of the wedge, and a heated chamber enclosing the receptacle, having an opening in its bottom through which the sheet of glass formed from the overflow streams which unite at the lower edge of the wedge passes out.

6. In an apparatus for producing sheet glass, a hollow wedge-shaped receptacle having downwardly converging sides, a longitudinal opening at the top and supply openings at the ends, means for flowing molten glass in through the end openings, an internal heating means for the wedge member, a heater above the wedge for heating the molten glass as it overflows down the sides of the wedge, and a heated chamber enclosing the receptacle, having a slot in its bottom through which the sheet of glass formed by the united overflowing streams of molten glass passes.

7. In an apparatus for producing sheet glass, a hollow wedge shaped receptacle having downwardly converging sides, a longitudinal opening at the top, and openings at its ends, means for conducting molten glass into the receptacle through the end openings, an electric heater within the wedge member, a heated chamber surrounding the receptacle, and a heater above the wedge for heating the molten glass as it overflows through the opening down the sides of the wedge, the chamber having a slot in its lower side through which the sheet formed by the overflowing streams of glass passes.

8. In an apparatus for producing sheet glass, a hollow wedge shaped receptacle having downwardly converging sides and a longitudinal opening at the top, a supply receptacle at each end of the wedge for conducting glass to the interior of the wedge shaped receptacle, means for flowing molten glass to the supply receptacles, an electric heater within the lower portion of the wedge, an enclosed heated chamber surrounding the receptacles, a heater above the opening in the wedge for heating the molten glass as it overflows through this opening, the chamber having a slot in its bottom through which the sheet of glass formed by the overflow down the sides of the wedge passes, and means for conducting away the sheet of glass as it emerges from the chamber.

9. In an apparatus for producing sheet glass, a hollow wedge shaped receptacle having downwardly converging sides and a longitudinal opening at the top, a supply receptacle or pot at each end of the wedge-member, having an open upper end and a lower conduit communicating with the interior of the wedge-member, a source of molten glass, means for flowing molten glass from the source to the supply receptacles, and means for regulating the flow, an electric heater within the lower portion of the wedge, an enclosing heated chamber surrounding the receptacles, a heater above the opening in the wedge shaped receptacle for reheating the molten glass as it overflows through this opening, the chamber having a slot or opening in its bottom through which the sheet of glass formed from the glass overflowing down the sides of the wedge passes, and means below this chamber for drawing away the sheet of glass.

Signed at Toledo, in the county of Lucas and State of Ohio, this 8th day of January, 1921.

HORACE E. ALLEN.